(12) United States Patent
Vorenkamp et al.

(10) Patent No.: US 8,677,434 B2
(45) Date of Patent: Mar. 18, 2014

(54) METHOD AND SYSTEM FOR DIRECT DIGITAL UP-CONVERSION IN A CABLE MODEM

(75) Inventors: Pieter Vorenkamp, Laguna Niguel, CA (US); Arnoldus G. Venes, Laguna Niguel, CA (US); Kevin L. Miller, Lawrenceville, GA (US); Chung-Ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1131 days.

(21) Appl. No.: 10/975,104

(22) Filed: Oct. 28, 2004

(65) Prior Publication Data

US 2005/0123029 A1 Jun. 9, 2005

Related U.S. Application Data

(60) Provisional application No. 60/526,274, filed on Dec. 3, 2003.

(51) Int. Cl.
*H04N 7/173* (2011.01)

(52) U.S. Cl.
USPC ............ 725/111; 725/148; 370/431; 370/463

(58) Field of Classification Search
USPC .............. 370/431, 463; 725/67, 70, 148, 111
See application file for complete search history.

(56) References Cited

U.S. PATENT DOCUMENTS

| | | | | |
|---|---|---|---|---|
| 5,323,157 | A * | 6/1994 | Ledzius et al. | 341/143 |
| 5,412,352 | A * | 5/1995 | Graham | 332/103 |
| 5,512,865 | A * | 4/1996 | Fague | 332/103 |
| 6,442,217 | B1 * | 8/2002 | Cochran | 375/326 |
| 2002/0059635 | A1 * | 5/2002 | Hoang | 725/111 |
| 2002/0073431 | A1 * | 6/2002 | Nikolich | 725/111 |
| 2002/0080448 | A1 * | 6/2002 | Kim et al. | 359/145 |
| 2002/0089995 | A1 * | 7/2002 | Shalvi et al. | 370/431 |
| 2002/0191635 | A1 * | 12/2002 | Chow et al. | 370/463 |
| 2003/0016701 | A1 * | 1/2003 | Hinson | 370/480 |
| 2003/0162514 | A1 * | 8/2003 | Chu et al. | 455/127 |
| 2003/0174784 | A1 * | 9/2003 | Samarasooriya et al. | 375/308 |
| 2003/0231716 | A1 * | 12/2003 | Unger | 375/296 |
| 2004/0192229 | A1 * | 9/2004 | Morris et al. | 455/91 |
| 2005/0009477 | A1 * | 1/2005 | Rakib et al. | 455/102 |

* cited by examiner

*Primary Examiner* — Mulugeta Mengesha
(74) *Attorney, Agent, or Firm* — Sterne, Kessler, Goldstein & Fox P.L.L.C.

(57) ABSTRACT

Provided are a method and system for a module for a cable modem termination system. The module includes a digital modulator configured to block up-convert a plurality of digital channels and a digital to analog converter coupled, at least indirectly, to an output of the digital modulator to convert the digital channels to an analog format.

22 Claims, 4 Drawing Sheets

METHOD AND SYSTEM FOR DIRECT DIGITAL UP-CONVERSION IN A CABLE MODEM

CROSS REFERENCE TO RELATED APPLICATIONS

This application claims the benefit of U.S. Provisional Application No. 60/526,274, filed Dec. 3, 2003, which is incorporated herein by reference.

BACKGROUND OF THE INVENTION

1. Field of the Invention

The present invention generally relates to the cable modems and up-conversion in cable modem systems.

2. Background Art

In a cable modem system, a number of channels, occupying a frequency range from 50 megahertz (MHz) to 860 MHz, are transmitted from a cable head-in over a cable system to one or more users. A conventional cable system transmitter, or cable modem termination system (CMTS), is composed mainly of analog components. That is, a conventional CMTS transmitter primarily comprises a combination of mixers, filters, amplifiers, and summation circuits in order to transmit and process a base-band signal. The base-band signal must then be modulated up to the required frequency, which is typically from about 50 to 860 MHz.

Also, in conventional CMTSs, a transmit up-converter within the CMTS utilizes an analog phase lock loop (PLL) for timing purposes. The PLL will typically include multiple clock sources, or a single tunable source, to generate local oscillator frequencies for up-conversion of the cable channels. This approach, however, creates multiple signals that can contribute to signal interference and distortion.

As the level of performance increases in the conventional CMTSs, testability also becomes an issue. For example, in the exemplary case of a 12-bit digital to analog converter (DAC), used within the CMTS, the performance level is commensurate with clock frequencies in excess of 2 giga-samples per second. In the absence of special test measures and procedures, it is virtually impossible to test, for example, this 12-bit DAC while the DAC is running as fast as giga-samples per second.

What is needed therefore is a system and method to provide modulation and block up-conversion to higher frequencies in the digital domain. It is desirable that elements of an up-converter within this system be formed on a single integrated circuit (IC). What is also needed is a system and method providing a built-in test capability for the system noted above.

BRIEF SUMMARY OF THE INVENTION

Consistent with the principles of the present invention as embodied and broadly described herein, the present invention includes a module for a CMTS. The module includes a digital modulator configured to block up-convert a plurality of digital channels and a digital to analog converter (DAC) coupled, at least indirectly, to an output of the digital modulator to convert the digital channels to an analog format.

Conventional CMTSs merely up-convert a single channel. An analog combiner will then combine all of the signals, that have been up-converted, in an analog combiner operating in the analog domain. The present invention, however, simultaneously block up-converts multiples channels in the digital domain.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and constitute part of the specification, illustrate embodiments of the present invention and, together with the general description given above and the detailed description of the embodiments given below, serve to explain the principles of the invention. In the drawings.

DETAILED DESCRIPTION OF THE INVENTION

Figure 1:
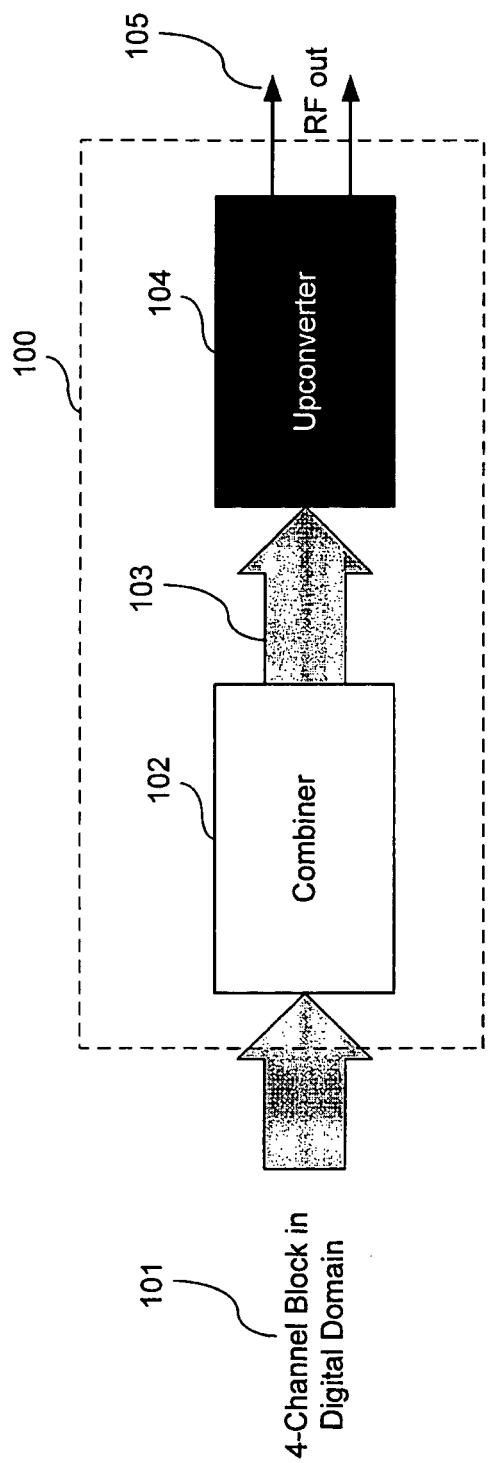
FIG. 1 is a block diagram illustration of a block up-conversion module in accordance with an embodiment of the present invention.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 is a block diagram illustration of a block up-conversion module 100 constructed in accordance with an embodiment of the present invention. In FIG. 1, the block up-conversion module 100 includes a combiner 102 and an up-converter 104. In contrast to the conventional analog approaches discussed above, the up-conversion module 100 performs block up-conversion (i.e., groups of channels simultaneously), versus of single channel up-conversion.

For example, the exemplary up-conversion module 100 of FIG. 1 can receive a four channel block of channels 101 in digital domain, as an input to the combiner 102. In FIG. 1, the four channel block can include, for example, quadrature amplitude modulated (QAM) signals. The four channel block 101 is received and combined within the combiner 102 and is provided as a single bit stream input to the up-converter 104. The combiner 102 can be, for example, a heterodyne combiner, although any suitable combiner can be used.

The up-converter 104 up-converts the received bit stream 103 and transforms the bit stream 103 from digital domain to analog domain, and produces an analog output signal 105. Although the present invention is not limited to a specific up-converter approach, the up-converter 104 is implemented as a 12-bit radio frequency (RF) DAC.

In the exemplary embodiment of FIG. 1, the combiner 102 and the up-converter 104 are formed on separate ICs, although the present invention is not limited to this implementation. Other implementations of an up-conversion module are possible, for example, whereby a combiner and an up-converter may be formed on a single IC.

It is desirable, however, that components within the up-converter 104 be formed on a single IC. This desire emerges from the difficulty in transmitting high speed data from one chip to the other. Arranging components within the up-converter 104 on a single IC facilitates the use of a lower speed digital interface between the components within the up-converter 104 (e.g., between the modulator and the DAC). This approach is more efficient and optimizes power consumption within the CMTS system.

Conventional CMTS systems up-convert a single channel and then have an analog combiner to up-convert the single channel, in the analog domain. In the embodiment of FIG. 1, the combiner 102 block up-converts multiple channels using a digital combiner 102 and a digital up-converter 104, as noted above.

Figure 2:
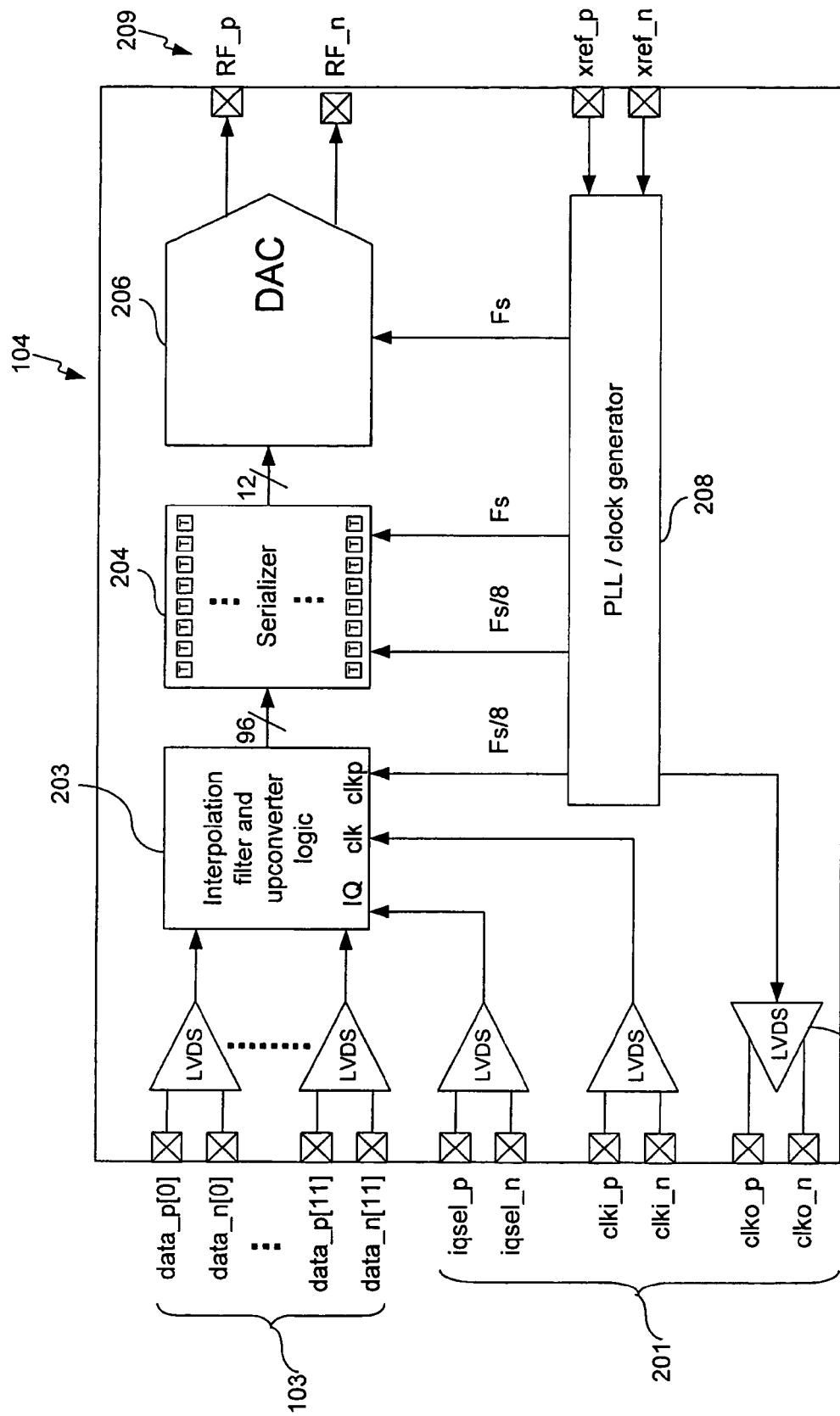
FIG. 2 is a detailed block diagram illustration of an exemplary up-converter used within the module of FIG. 1.

The inventors of the present application implemented the up-converter 104 as a 12-bit DAC based upon noise requirements and linearity requirements described in the Data Over Cable Service Interface Specification (DOCSIS) specification. The present invention, however, is not limited to a 12-bit DAC—any suitable implementation can be utilized. FIG. 2 provides a more detailed blocked diagram illustration of the up converter 104 shown in FIG. 1.

In FIG. 2, the single bit stream 103 is received as an input to the up-converter 104, as described above. A single bit stream 103 is received at an input port to the up-converter 104 in the form of 12 differential data inputs. Each of the data inputs 103 includes a non-inverting data component and an inverting data component. Each of the 12 data inputs 103 is received as an input to low voltage differential signaling (LVDS) amplifiers 202. An exemplary data format for the input data stream 103 includes quadrature QAM signals.

Although any suitable amplifiers can be used, the LVDS amplifiers 202 are used in the exemplary embodiment of FIG. 2 because of their efficiency at facilitating an interface between the base-band combiner 102 and the up-converter (RF chip) module 104. That is, the LVDS amplifiers 202 are representative of a standard signaling scheme and do not limit the present invention to any particular approach.

In the embodiment of FIG. 2, control signals 201 are used to trigger particular processing modes associated with input of the data stream 103. As known by those of skill in the art, each QAM signal input includes I and Q components. In the exemplary up-conversion module 104, an LVDS amplifier, triggered by a subset of the control signals 201 (iqsel_p and iqsel_), is used to multiplex between differential I and Q inputs.

Other synchronization methods can be used in addition to the I/Q selector 201. For example, by sending a control signal into this block to delay the high speed clock signal (Fs), and in cooperation with a training sequence of input data, the timing can be adjusted to capture the correct I/Q signals. Delaying the high speed clock can adjust the clock phase of the lower speed clocks such as Fs/8, so that the clock edge used to capture the to input LVDS data can be adjusted based on the error rate of the received signals. This timing adjustment may require a training sequence in LVDS data stream. On the other hand, an additional designated input can be specifically be used for this purpose.

Next, input clock signals clki_p and clki_n are used to synchronize the base-band combiner chip 102 with the up-converter chip 104. The input clock signals clki_p and clki_n are used to maintain synchronism between the combiner chip 102 and the up-converter chip 104.

The up-converter 104 includes an interpolation filter and up-converter logic module 203, a serializer 204, a 12-bit DAC 206, and a PLL/clock generator 208. The interpolation filter and up-converter logic 203 interpolates, or modulates, the 12 individual portions (data_p[0]data_n[0]-data_p[11]/data_n[11] of the input data stream 103. The interpolation filter and up-converter logic 203 essentially provide low speed multiplication and interpolation by multiplying the input data stream by a factor of 8. The filter portion of the logic 203 produces a modulated output stream comprised of 12 paths of 8-bit data, thus producing a 96-bit data stream as an output.

That is, the logic of the combiner 102 operates at a much lower speed than the DAC 206 and the interpolation filter and up-converter logic 203 uses routine synthesization techniques in order to interpolate the input data stream 103. The input data signal 103 provided as an input to the interpolation filter and up-converter logic 203 is sitting at base-band, lower frequencies. The output signal of the interpolation filter 203 is up converted to a higher frequency 860 MHz. The higher frequency is not represented as a single 12-bit bit stream. Instead, the output of the interpolation filter and up-converter logic 203 is at eight times a lower frequency. Thus producing the 96 bit data stream output. The interpolation filter and up-converter logic 203 receives the IQ and clock control signals (clk) from the control signals 201, as illustrated in FIG. 2.

The PLL 208 is a fixed clock that provides all of the clocking functions within the up-converter module 104. The PLL 208 provides a time base in the form of a sampling frequency signal provided to the interpolation filter 203 (signal Fs/8), the serializer 204 (signal Fs/8), and the DAC 206 (signal Fs).

The PLL clock generator 208 provides timing based on a referenced clock signal (xref_p and xref_n) from a reference crystal oscillator. The PLL clock generator 208 also provides an output signal to an LVDS amplifier in the form of output clock signals clko_p and clko_n to synchronize the up-converter 104 with the combiner 102, or other external components.

Although FIG. 2 indicates that the PLL 208 is formed on the same IC as the serializer 204, the DAC 206 and the other components of the up-converter 104, the present invention is not limited to this implementation. That is, the PLL 208 can be on chip or off chip.

The serializer 204 is an analog device running at full speed and converts the 96-bit input data stream into an output 12-bit data stream. The PLL 208 enables the interpolation filter 203 and the serializer 204 to run synchronously with the DAC 206. The PLL 208 also provides the sampling frequency signal $F_S$ at one eighth at the sampling rate. The PLL clock generator 208, however, provides the sampling frequency signal $F_S$ at a full sampling rate to the DAC 206.

In the exemplary embodiment of FIG. 2, the up-conversion module 104 operates at a sampling rate of between 2 and 2.5 gigahertz, although the present invention is not restricted to such a sampling rate. The serializer 204 receives an input signal from the interpolation filter and up-converter logic 203. In the present exemplary embodiment, the serializer 204 is an 8:1 serializer, although any suitable serializer can be used. The 8:1 serializer 204 serializes the 12-bit stream and provides a final 12-bit bit full speed stream as an input to the DAC 206.

In FIG. 2, the DAC 206 is implemented as a 12-bit DAC in accordance with requirements of DOCSIS interface standards for cable modems and supporting equipment. The present invention however is not limited to a 12-bit implementation. In the up-conversion module 104, the DAC 206 is constructed as a combination of binary weighting of bits and segmentation. Any combination or weighting of the two binary weighting and segmentation techniques is possible.

In the up-conversion module 104, the interpolation filter and up-converter logic 202 performs the actual up conversion and modulation of the input data stream 103. The DAC 206 converts the input data stream from digital to analog domain. Also, in the exemplary embodiment of FIG. 2 the interpolation filter and up-converter logic 202, the serializer 204, the 12-bit DAC 206, and the PLL clock generator 208 are formed on a single IC, although the present invention is not limited to this particular implementation.

Figure 3:
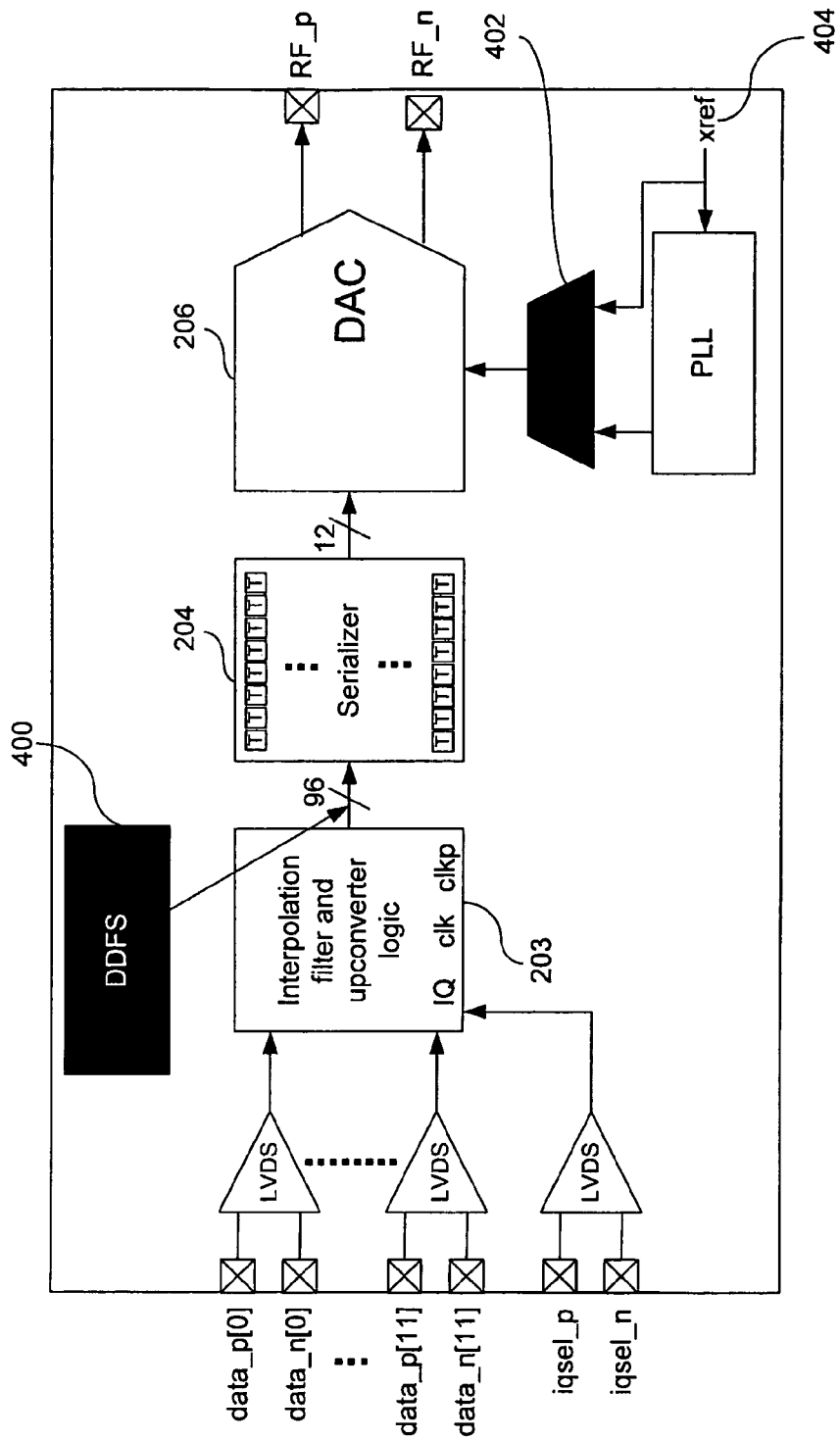
FIG. 3 is a detailed block diagram illustration of the up-converter of FIG. 2 having built in testability in accordance with an embodiment of the present invention.

FIG. 3 is a detailed block diagram of another embodiment of the up-conversion module 104 having built-in test capability. As shown in FIG. 3, a two-toned direct digital frequency synthesizer (DDFS) is used as a testability component during production testing, bench testing, as well as user evaluations. The two-toned DDFS 400 is used as a means of generating test patterns for accommodating built-in testing of the up-conversion module 104. The test patterns are made up of sine waves that form digital test signals.

More specifically, the DDFS 400 provides a fixed input data word comprising an arbitrary number of bits. Although the DDFS 400 shown in FIG. 3 is of the two-tone variety and produces a sine wave as an output at two independent frequencies, the present invention is not limited to this specific implementation.

A DDFS producing any suitable number of output tones or producing output data words having any suitable format can be used. The output of the DDFS 400 is used as a known input for the DAC 206. In the exemplary embodiment of FIG. 3, the DDFS 400 provides two independent frequencies as inputs, at least indirectly, to the 12-bit DAC 206.

More specifically, the DDFS 400 provides a known stimulus for the DAC 206 that can be evaluated by testers to determine whether the DAC 206 is functioning properly. During a testing sequence, an output produced by the DDFS 400 will be multiplexed with an output from the interpolation filter and up-converter logic 203 and is provided as an input to the DAC 206. This process provides a stand alone test mode for characterization of the DAC 206 and enables testers to bypass potential unknowns facilitated by the interface between the combiner 102 and the up-conversion module 104.

The advantage of the embodiment of FIG. 3 is that a tester can debug the up-conversion module 104 and evaluate various aspects of the module separately. For example, a tester attempting to isolate a potential malfunction, can exclude consideration of the digital interface between the combiner 102 and up-conversion module 104, and completely focus on potential factors within the up-converter 104. By using the DDFS 400, the tester can evaluate problems within the up-conversion module 104 while the module 104 is running at high speed. Thus, the DDFS 400 shown in FIG. 3 provides built in testability for the up-conversion module 104.

Further, a PLL bypass mode enables testers take the PLL off-line, effectively eliminating the PLL clock generator 208 as a potential factor in chip malfunctions. By using a multiplexer 402, a direct clock input from a reference source 404 can be used for timing, instead the PLL. This removes the PLL from the equation of potential causes of anomalies within the up-conversion module 104. That is, the DAC 206 can be driven by an external clock, produced by the reference source 404, to isolate any potential problems between the DAC 206 and the PLL.

Figure 4:
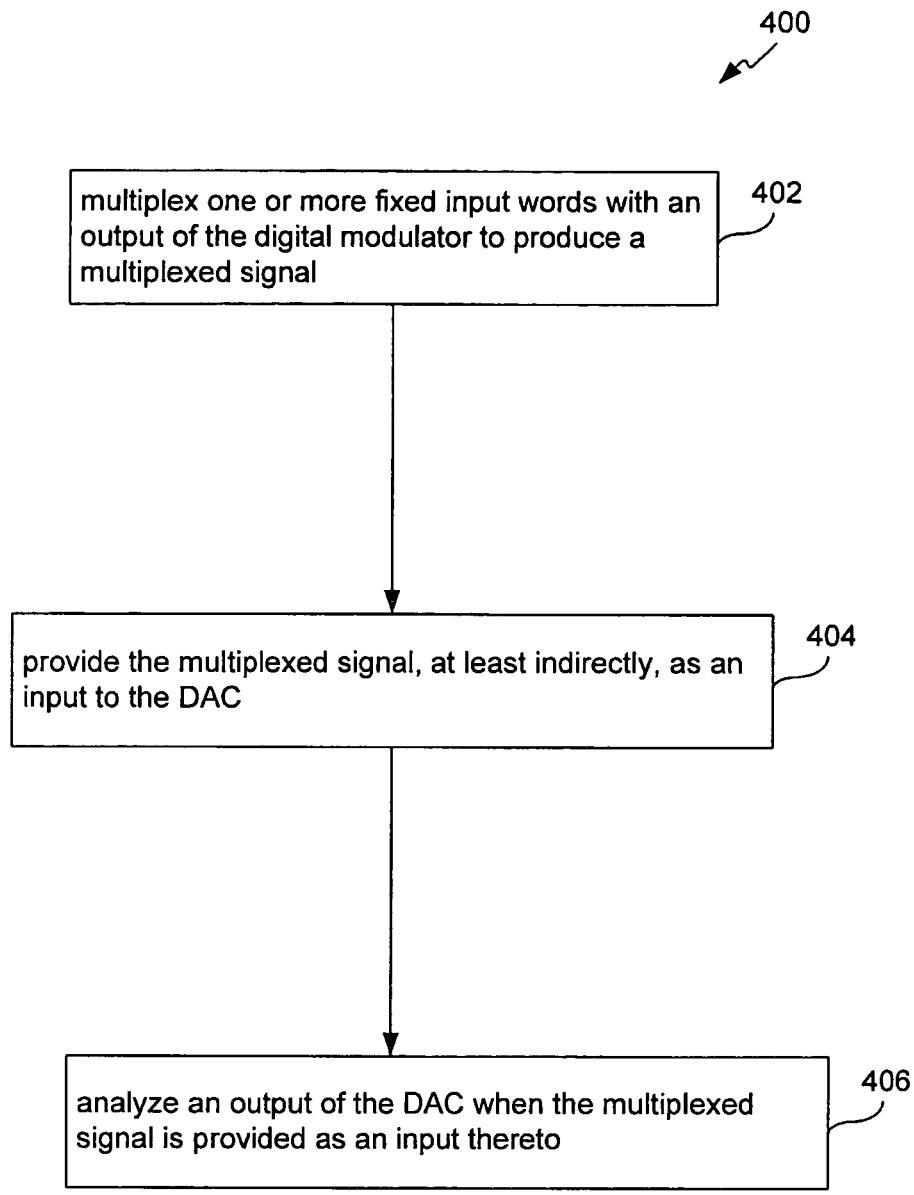
FIG. 4 is an exemplary flowchart of a method of practicing an embodiment of the present invention.

FIG. 4 is a flowchart of an exemplary method 400 of practicing an embodiment of the present invention. In FIG. 4, one or more fixed input words are multiplexed with an output of the digital modulator 203 to produce a multiplex single output as illustrated in step 402. In step 404, the multiplexed, signal is provided, at least indirectly, as an input to the DAC 206. In step 406, the output of the DAC is analyzed when the multiplexed signal is provided as an input thereto in order to evaluate and characterize potential problems associated with operation of the DAC 206 during testing.

CONCLUSION

The present invention provides a system and method to modulate and block up-convert digital channels to higher frequencies in the digital domain. Elements within the up-converter are formed on a single IC. The system of the present invention also provides a built-in test capability. This unique testing capability enables testers to evaluate problems within the up-conversion module while the module is running at high speed.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What we claim is:

1. A module for a cable modem termination system (CMTS), comprising:
   a digital modulator configured to up-convert, in a digital domain, a plurality of digital channels received in parallel, to one or more higher transmit frequency ranges in accordance with DOCSIS standards for CMTS downstream transmissions, the up-conversion being based on a first sampling frequency;
   a digital to analog converter (DAC) coupled, at least indirectly, to the digital modulator to convert the up-converted digital channels to an analog format based on a second sampling frequency; and a clock, coupled to the digital modulator and the DAC, configured to provide the first sampling frequency and the second sampling frequency, wherein the second sampling frequency is a multiple of the first sampling frequency.

2. The module of claim 1, further comprising a serializer coupled between the digital modulator and the DAC.

3. The module of claim 2, wherein the digital modulator includes an interpolation filter and up-converter logic.

4. The module of claim 1, wherein the digital modulator is a digital up-converter.

5. The module of claim 1, wherein the plurality of digital channels are adjacent to one another.

6. The module of claim 5, wherein each of the channels includes a quadrature amplitude modulated (QAM) carrier signal.

7. The module of claim 1, wherein the digital modulator includes an interpolation filter and up-conversion logic.

8. The module of claim 1, wherein the digital modulator and the DAC are formed on a single integrated circuit (IC).

9. The module of claim 8, wherein the digital modulator and the DAC are based upon a clock speed greater than or equal to two giga-samples per second.

10. The module of claim 1, wherein the DAC is a 12 bit DAC.

11. The module of claim 1, wherein the module includes built-in testability.

12. The module of claim 11, the built-in testability comprising a direct digital frequency synthesizer configurable for being multiplexed with the up-converted digital channels and being provided as an input, at least indirectly, to the DAC.

13. An up-conversion system for a cable modem termination system (CMTS) configured to simultaneously up-convert a plurality of digital channels, comprising:
  a combiner to combine the plurality of digital channels into a single digital bit-stream having an inverting and a non-inverting data component and representative of the plurality of digital channels;
  a digital modulator to modulate, in the digital domain, the digital bit-stream to one or more higher transmit frequency ranges in accordance with DOCSIS standards for CMTS downstream transmissions based on a first sampling frequency;
  a serializer to receive the modulated digital bit-stream from the digital modulator in parallel and to serialize the modulated digital bit-stream into a data stream based on a second sampling frequency;
  a digital to analog converter (DAC) for converting the data stream into one or more up-converted analog radio frequency output signals; and
  a clock to provide the first sampling frequency and the second sampling frequency, wherein the second sampling frequency is an integer multiple of the first sampling frequency.

14. The up-conversion system of claim 13, wherein the combiner is of a heterodyne variety.

15. The up-conversion system of claim 13, wherein the digital modulator and the DAC are formed on a first single integrated circuit (IC); and wherein the combiner is formed on a second IC.

16. The up-conversion system of claim 13, wherein the digital modulator, the DAC, and the combiner are formed on a single IC.

17. A method for testing a block up-converting module within a cable modem termination system (CMTS), the module including a digital modulator coupled to a digital to analog converter (DAC) and configured to up-convert, in a digital domain, a plurality of digital channels to one or more higher transmit frequency ranges in accordance with DOCSIS standards for CMTS downstream transmissions, the up-conversion being based on a first sampling frequency, the method comprising:
  providing first and second sampling signals to the block up-converting module;
  multiplexing one or more fixed input words with an output of the digital modulator to produce a multiplexed signal based on the first sampling signal;
  providing the multiplexed signal as an input to the DAC based on a second sampling frequency; and
  comparing an output of the DAC with an analog signal based on the one or more fixed input words,
  wherein the second sample frequency is an integer multiple of the first sampling frequency.

18. The method of claim 17, wherein the fixed input words are representative of two or more independent frequencies.

19. The method of claim 18, wherein the two or more independent frequencies are produced in accordance with direct digital frequency synthesis principles.

20. The method of claim 17, wherein the multiplexing and the providing occur while the DAC is operating at speed.

21. A up-conversion module for up-converting a plurality of digital channels in a cable modem termination system (CMTS), comprising:
  a combiner module, configured to combine the plurality of digital channels into a single bit stream;
  an interpolation filter and up-converter module, logically coupled to the combiner module, configured to interpolate and filter a portion of the single bit stream to produce a modulated output stream at a first sampling frequency, wherein the modulated output stream comprises a plurality of bits for each bit of the portion of the single bit stream, and the modulated output stream for the portion is produced in parallel;
  a serializer module, coupled to the interpolation filter and up-converter module, configured to serialize the modulated output stream;
  a digital to analog converter (DAC) module, coupled to the serializer module, configured to convert the serialized modulated output stream to an analog format at a second sampling frequency; and
  a clock, coupled to the combiner module, the interpolation filter and up-converter module, the serializer module, and the DAC module, configured to provide first and second sampling signals for synchronizing the up-conversion, wherein the second sampling frequency is a multiple of the first sampling frequency.

22. An up-conversion system for a cable modem termination system (CMTS) configured to simultaneously up-convert a plurality of digital channels, comprising:
  a combiner to combine the plurality of digital channels into a single digital bit-stream;
  a digital modulator to modulate, in the digital domain, the digital bit-stream based on a first sampling frequency, wherein the modulation is performed simultaneously on each of the digital channels of the plurality of digital channels, and the modulated digital bit-stream comprises a plurality of parallel data paths;
  a serializer to serialize the modulated digital bit-stream into a data stream based on a second sampling frequency;

a digital to analog converter (DAC) for converting the data stream into an up-converted analog radio frequency output signals based on the second sampling frequency; and a clock to provide the first sampling frequency and the second sampling frequency, wherein the second sample frequency is higher than the first sampling frequency.

\* \* \* \* \*